(12) United States Patent
Chu

(10) Patent No.: US 7,330,361 B1
(45) Date of Patent: Feb. 12, 2008

(54) CAPACITOR CHARGING MODULE

(75) Inventor: Yi-Shan Chu, Hsin-Chu (TW)

(73) Assignee: Leadtrend Technology Corp., Hsin-Chu (TW)

( * ) Notice: Subject to any disclaimer, the term of this patent is extended or adjusted under 35 U.S.C. 154(b) by 0 days.

(21) Appl. No.: 11/535,074

(22) Filed: Sep. 26, 2006

(51) Int. Cl.
*H02M 3/335* (2006.01)
*H02M 7/515* (2006.01)

(52) U.S. Cl. .................. 363/21.12; 363/97

(58) Field of Classification Search .......... 363/16, 363/20, 21.01, 21.12, 21.17, 97, 131, 21.04, 363/21.09, 21.1, 21.18; 323/222, 282, 284, 323/288; 320/140, 141, 145
See application file for complete search history.

(56) References Cited

U.S. PATENT DOCUMENTS

| | | | |
|---|---|---|---|
| 5,602,465 A * | 2/1997 | Clemente | 323/300 |
| 6,229,723 B1 * | 5/2001 | Umetsu et al. | 363/71 |
| 6,518,733 B1 | 2/2003 | Schenkel et al. | |
| 2005/0104560 A1 | 5/2005 | Pai | |

* cited by examiner

*Primary Examiner*—Gary L. Laxton
(74) *Attorney, Agent, or Firm*—Winston Hsu

(57) ABSTRACT

Disclosed is a capacitor charging module, comprises: a power switch; a power delivery device controlled by the power switch, for providing a charging current to the output capacitor according to a voltage source; a voltage divider for providing a feedback voltage according to the voltage on the output capacitor; a control circuit, for controlling on/off operation of the power switch according to the feedback voltage value, wherein the control circuit turns off the power switch when the voltage level on the output capacitor is at or above the pre-determined value; a first rectifier component, for preventing the feedback voltage being a negative voltage during on periods of the power switch; and a second rectifier component, for preventing an leakage current flowing from the output capacitor to the power delivery device.

10 Claims, 6 Drawing Sheets

CAPACITOR CHARGING MODULE

BACKGROUND OF THE INVENTION

1. Field of the Invention

The present invention relates to a capacitor charging module, particularly relates to a capacitor charging module utilizing rectifying component to avoid reverse current and negative voltage.

2. Description of the Prior Art

Please refer to FIG. 1. FIG. 1 is a schematic diagram illustrating a prior art capacitor charging module 100. The voltage on the charged capacitor is always used for a flash module of a camera. The capacitor charging module 100 comprises a power switch 110, a power delivery device 112, a voltage divider 114, a control circuit 116 and a rectifier component 118. The power delivery device 112 is controlled by the power switch 110 for providing a charging current I through the rectifier component 118 to the output capacitor 120 according to a voltage source $V_{in}$. The voltage divider 114 is used for providing a feedback voltage $V_{FB}$ according to the voltage on the output capacitor 120. The control circuit 116 is coupled to the voltage divider 114 and the power switch 110, for controlling on/off operation of the power switch 110 according to the feedback voltage $V_{FB}$. The control circuit 116 turns off the power switch 110 when the voltage level $V_{out}$ on the output capacitor 120 is at or above the pre-determined value $V_{ref}$. Conventionally, the power delivery device 112 is a flyback transformer, the power switch 110 is a MOSFET, and the control circuit 116 comprises a comparator 122, a control unit 124, and a driver 126. Also, the voltage divider 114 comprises a resistor 128 and a resistor 130. Since the detail structure and operation of the capacitor charging module 100 is well-known by persons skilled in the art, it is omitted for brevity.

However, there will be a leakage current $1_{leak}$ from the output capacitor 120 to the voltage divider 120 after the output capacitor 120 is charged, and the out voltage $V_{out}$ will decrease.

FIG. 2 is a schematic diagram illustrating a prior art capacitor charging module 200, which is disclosed in U.S. Pat. No. 6,518,733. The capacitor charging module 200 includes some same devices as a capacitor charging module 100, which comprises a power switch 210, a power delivery device 212, a voltage divider 214, a control circuit 216. The structure of the capacitor charging module 100 and 200 are different, however. As shown in FIG. 2, the structure of the capacitor charging module 200 can prevent the problem of leakage current from the output capacitor 220. According to the capacitor charging module 200, $V_{out}$ is equal Vref (1+R2/R1)*Ns/Np in this structure, but Ns/Np has tolerance about +−3% due to coupling factor and coil mapping while the fly-back transformer 212 being manufactured. Therefore, the out voltage Vout of FIG. 2 is less accurate than FIG. 1. A more detailed description regarding the circuit is disclosed in U.S. Pat. No. 6,518,733, and is therefore omitted here for brevity.

FIG. 3 is a schematic diagram illustrating a prior art capacitor charging module 300, which is disclosed in US patent 2005/0104560. The capacitor charging module 300 includes the same devices as capacitor charging module 100, which comprises a power switch 310, a power delivery device 312, a voltage divider 314, a control circuit 316. The only difference of the capacitor charging module 100 and 300 is the location of rectifying component 118 and 318. In the capacitor charging module 300, the rectifying diode 318 can prevent the leakage current from the capacitor 330. However, the structure of the capacitor charging module 300 will cause feed back voltage $V_{FB}$ a negative voltage, which is shown as the following equation:

$$V_{FB}=-(V_{in}*N+V_{spike})*R1/(R1+R2), N=Ns/Np$$

Where Vspike is a spike voltage happening at the Second winding. The spike voltage is produced by the parasitic capacitance and the secondary leakage inductance of the transformer. A more detailed description regarding the circuit is disclosed in US2005/0104560, and is therefore omitted here for brevity.

FIG. 4 is a schematic diagram illustrating the waveform of the feedback voltage. As shown in FIG. 4, a negative voltage occurs at region A. In general cases, the negative voltage maybe down to −0.8V. An IC (integrated circuit) may be latched up or damaged if the $V_{FB}$ is a negative voltage less than −0.3V, thus causing a serious problem.

Besides, for capacitor charging module 100 and 300, there will be a high voltage from the second winding 113 and 313, thus the diode 118 and 318 suffers a high voltage. As know by persons skilled in the art, an electronic device capable of suffering high voltage is always expensive and has a large area, thereby increases the cost of circuit and decreases the flexibility of design.

Thus, a new invention is needed to solve above-mentioned problems.

SUMMARY OF THE INVENTION

One objective of the present invention is to provide a charging module with a device for avoiding the leakage current and a device for avoiding a negative feed back voltage.

Another objective of the present invention is to provide a charging module with lower cost and smaller area by utilizing two electronic devices to suffer a predetermined voltage.

The present invention discloses a capacitor charging module for maintaining a pre-determined voltage level on an output capacitor, comprises: a power switch; a power delivery device controlled by the power switch, for providing a charging current to the output capacitor according to a voltage source; a voltage divider for providing a feedback voltage according to the voltage on the output capacitor; a control circuit coupled to the voltage divider and the power switch, for controlling on/off operation of the power switch according to the feedback voltage value, wherein the control circuit turns off the power switch when the voltage level on the output capacitor is at or above the pre-determined value; a first rectifier component, coupled between the voltage divider and the power delivery device, for preventing the feedback voltage being a negative voltage during on periods of the power switch; and a second rectifier component, coupled to the output capacitor, the first rectifier component, and the voltage divider, for preventing an leakage current flowing from the output capacitor to the power delivery device.

According to the above-mentioned embodiment, the leakage current and the negative feedback voltage can be avoided. Furthermore, the cost and area of the circuit can be reduced.

These and other objectives of the present invention will no doubt become obvious to those of ordinary skill in the art after reading the following detailed description of the preferred embodiment that is illustrated in the various figures and drawings.

DETAILED DESCRIPTION

Figure 5:
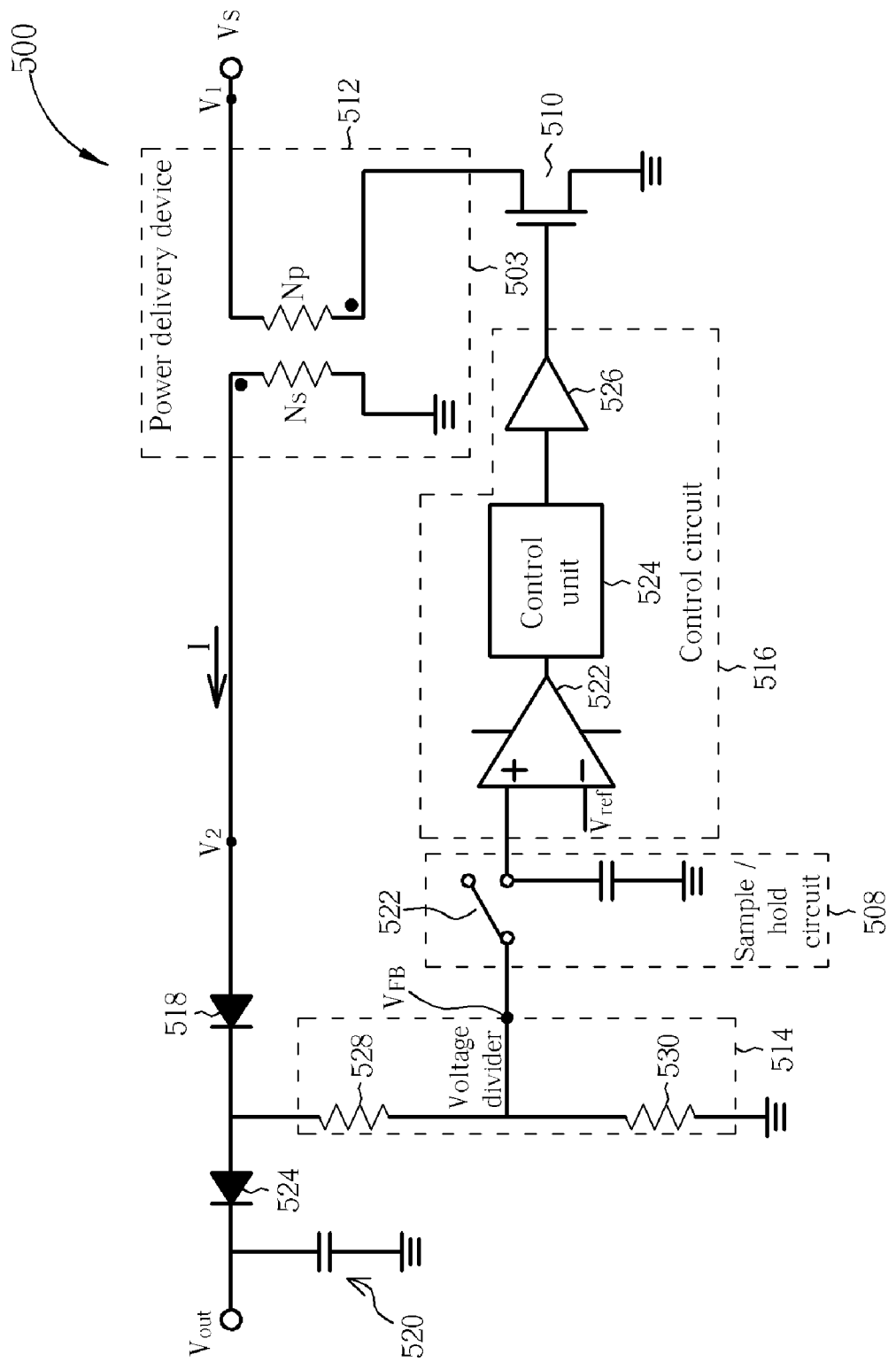
FIG. 5 is a schematic diagram illustrating a charging module according to the preferred embodiment of the present invention.

FIG. 5 is a schematic diagram illustrating a charging module 500 according to the preferred embodiment of the present invention. As shown in FIG. 5, the charging module 500 comprises a power switch 510, a power delivery device 512, a voltage divider 514, a control circuit 516, first rectifier component 518 and a second rectifier component 524. The power delivery device 512 is controlled by the power switch 510 for providing a charging current I to the output capacitor 520 according to a voltage source $V_S$. The voltage divider 514 is used for providing a feedback voltage $V_{FB}$ according to the output voltage $V_{out}$ on the output capacitor 520. The control circuit 516 is coupled to the voltage divider 514 and the power switch 510, for controlling on/off operation of the power switch 510 according to the feedback voltage $V_{FB}$. The control circuit 516 turns off the power switch 510 when the voltage level on the output capacitor 520 is at or above the pre-determined value $V_{ref}$. The first rectifier component 518, which is coupled between the voltage divider 514 and the power delivery device 512 for preventing the feedback voltage $V_{FB}$ being a negative voltage during on periods of the power switch. The second rectifier component 524, which is coupled to the output capacitor 520, the first rectifier component 518, and the voltage divider 514, is used for preventing an leakage current flowing from the output capacitor 520 to the power delivery device 512. According to the charging module 500, the leakage current from the output capacitor 520 can be blocked by the second rectifying component 524, and the first rectifying component 518 can avoid the feedback voltage $V_{FB}$ being a negative voltage.

The capacitor charging module 500 further comprises a sample/hold circuit 508, which is coupled to the voltage divider 514, is used for sampling and holding the feedback voltage $V_{FB}$ during off periods of the power switch 510. Since the feedback voltage $V_{FB}$ is a pulse instead of a DC voltage, the operation of the power switch 510 may have errors if the control circuit 516 controls the power switch 510 according to the wrong value of the pulse. In this embodiment, the sample/hold circuit 508 is used for sampling the largest value of the pulse to generate the feedback voltage, but it can also be used for sampling other parts of the pulse to generate feedback voltage. This modification also falls within the scope of the present invention.

Furthermore, the prior art charging module uses a single device to suffer a high voltage (for example, 800v) on the secondary winding, thus the device is with a high cost and large area. As known by persons skilled in the art, the cost and area of the electronic device decreases greatly corresponding to the voltage suffering capability of the electronic device, therefore the cost and area of two low-voltage-suffering electronic devices (for example, 400v and 400v) will be less than a high-voltage-suffering electronic device. Thus, since this embodiment utilizes two rectifying components to suffer the high voltage suffered by a single electronic device originally (for example, 800v), the cost and area of the charging module can be decreased. It should be noted that each rectifying component is not limited to suffer 400v, and the total voltage suffered by the first and second components is not limited to be 800v. The preferred examples of the first and second rectifying components are diodes, but other electronic devices that can provide the same function can also be used. Preferably, the two diodes can be disposed in a single electronic device such as a dual diode. Thereby the cost and area of the charging module can further be decreased.

If the capacitor charging module 500 is used for the flash light of a camera, the voltage source Vs is a battery of the camera, and the output capacitor 520 is coupled to a flash light module of the camera. In this case, the power delivery device 512 is a flyback transformer, the voltage divider 514 comprises resistors 528 and 530, and the control circuit 516 includes a comparator 522, a control unit 524, and a driver 526, but this example should not be taken as a limitation of the scope of the present invention.

Figure 1:
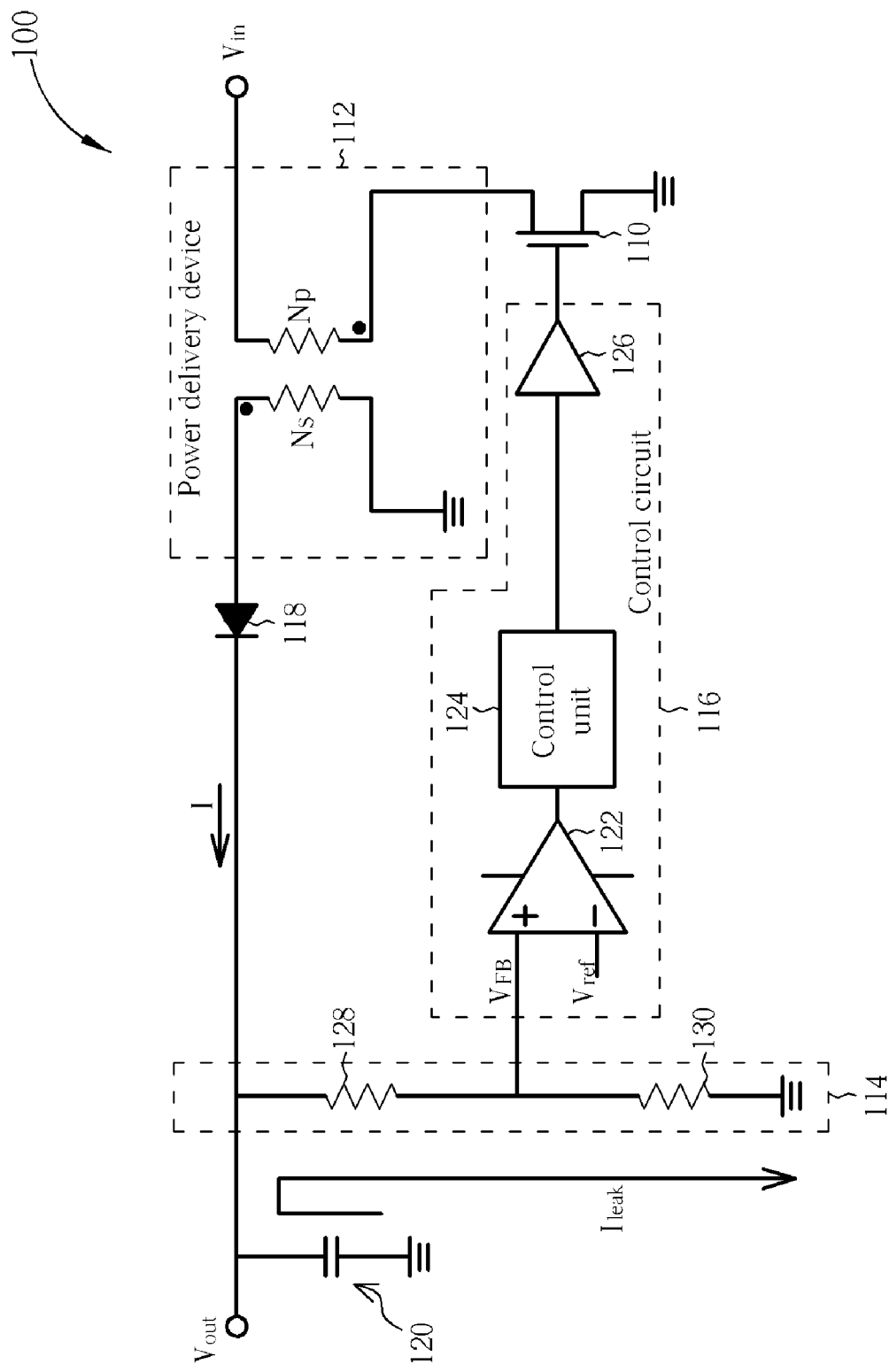
FIG. 1 is a schematic diagram illustrating a prior art charging module.
Figure 2:
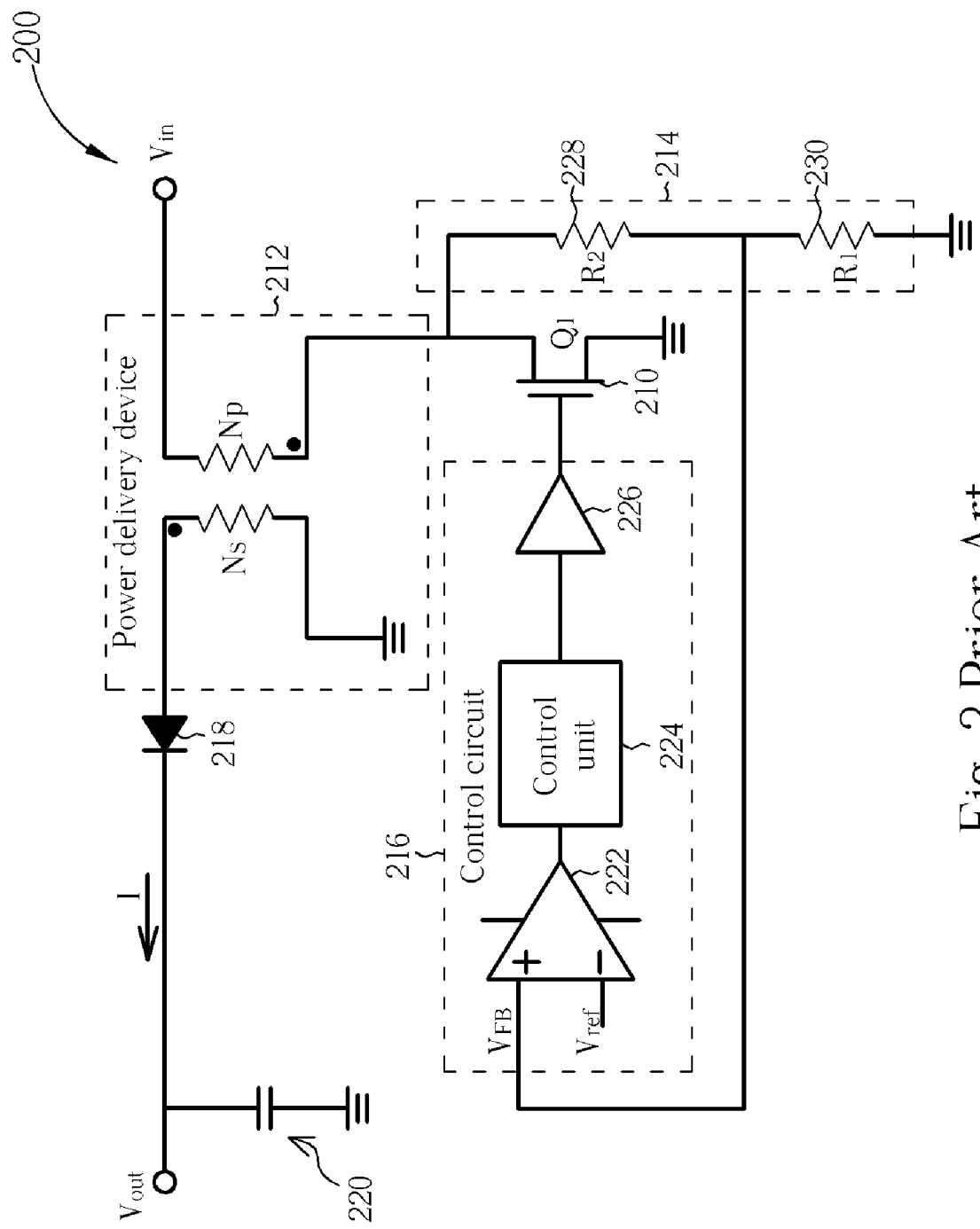
FIG. 2 is a schematic diagram illustrating a prior art charging module.
Figure 3:
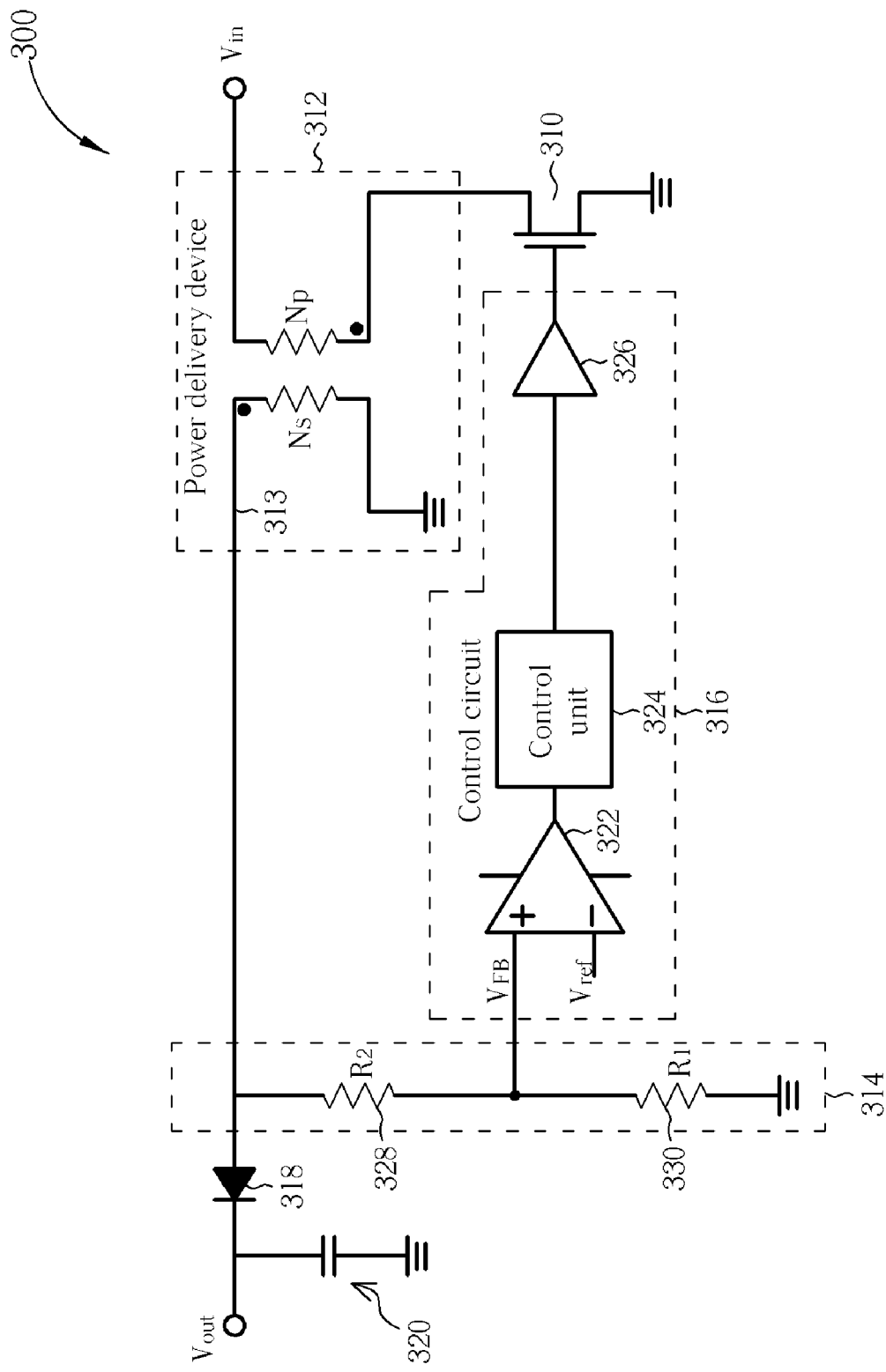
FIG. 3 is a schematic diagram illustrating a prior art charging module.
Figure 4:
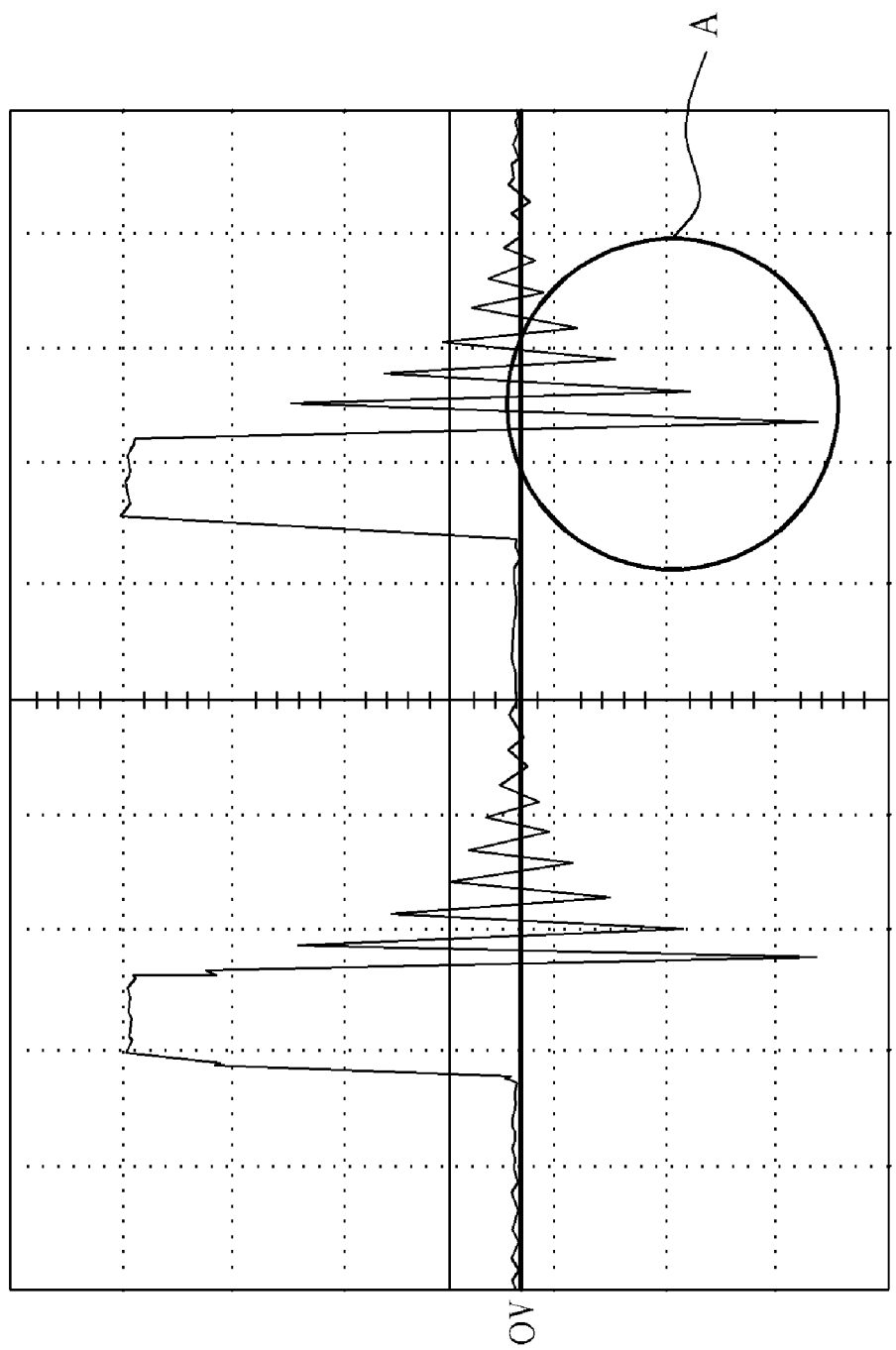
FIG. 4 is a schematic diagram illustrating the waveform of the feedback voltage of the prior art charging module shown in FIG. 3.
Figure 6:
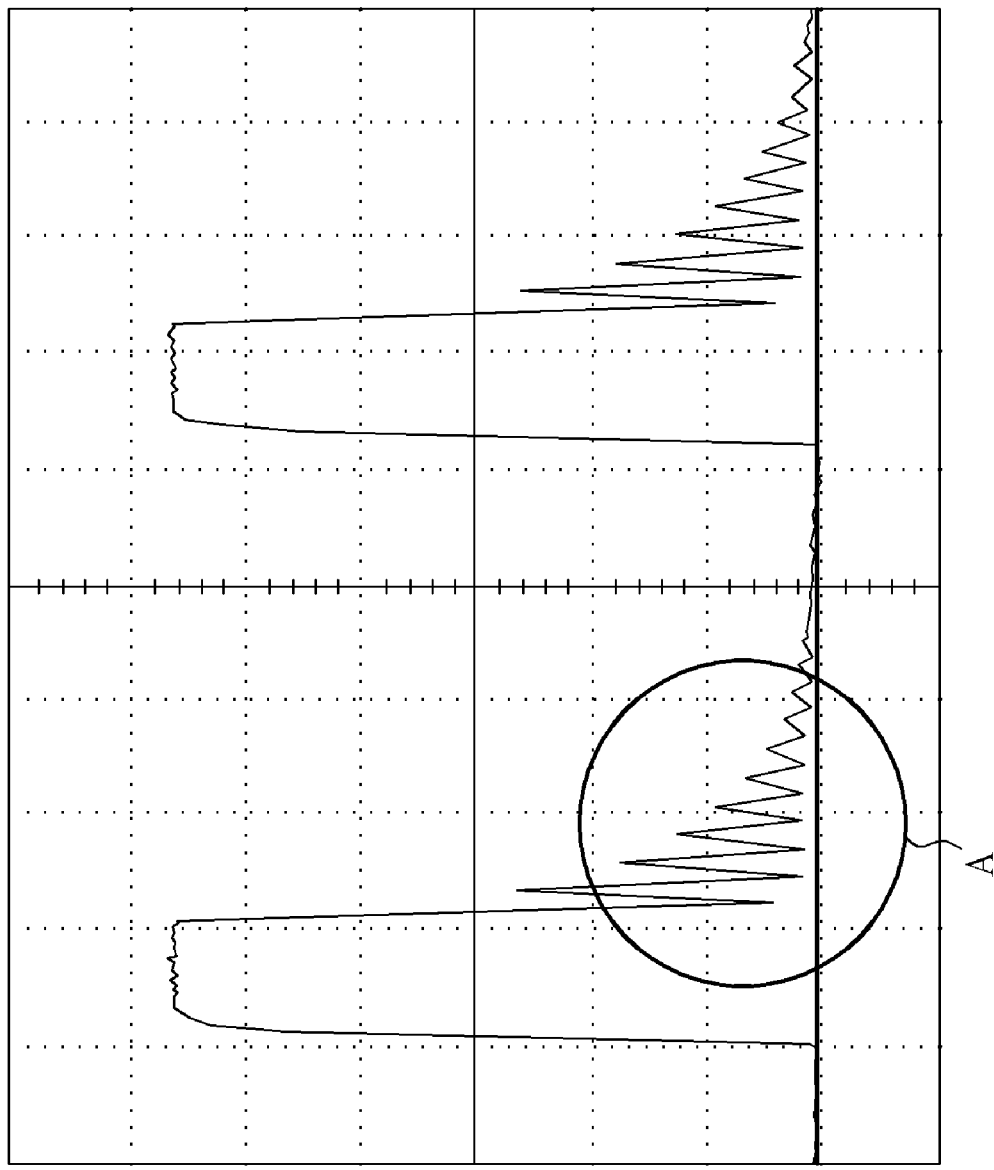
FIG. 6 is a schematic diagram illustrating the waveform of the feedback voltage according to the preferred embodiment of the present invention.

FIG. 6 is a schematic diagram illustrating the waveform of the feedback voltage $V_{FB}$ according to the preferred embodiment of the present invention. As shown in FIG. 6, the region A does not have a negative voltage as in FIG. 4. This proves that the first rectifying component can effectively prevent the feedback voltage $V_{FB}$ from being negative.

According to the above-mentioned embodiment, the leakage current and the negative feedback voltage can be avoided. Furthermore, the cost and area of the circuit can be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A capacitor charging module for maintaining a pre-determined voltage level on an output capacitor, comprising:
    a power switch;
    a power delivery device controlled by the power switch, for providing a charging current to the output capacitor according to a voltage source;
    a voltage divider for providing a feedback voltage according to the voltage on the output capacitor;
    a control circuit coupled to the voltage divider and the power switch, for controlling on/off operation of the power switch according to the feedback voltage value, wherein the control circuit turns off the power switch when the voltage level on the output capacitor is at or above the pre-determined value;
    a first rectifier component, coupled between the voltage divider and the power delivery device, for preventing the feedback voltage being a negative voltage during on periods of the power switch; and
    a second rectifier component, having a first end coupled to the output capacitor and having a second end coupled to the first rectifier component and the voltage divider, for preventing an reverse current flowing from the output capacitor to the power delivery device.

2. The capacitor charging module of claim 1, further comprises a sample/hold circuit, coupled to the voltage divider, for sampling and holding the feedback voltage during off periods of the power switch.

3. The capacitor charging module of claim 1, wherein one of the first rectifier and the second rectifier components is a diode.

4. The capacitor charging module of claim 1, wherein the first rectifier and the second rectifier components are diodes.

5. The capacitor charging module of claim 4, wherein both the first and second rectifier components are disposed in a single electronic device.

6. The capacitor charging module of claim 5, wherein the single electronic device is a dual diode.

7. The capacitor charging module of claim 1, wherein the output capacitor is coupled to a flash light module.

8. The capacitor charging module of claim 1, wherein the voltage source is a battery.

9. The capacitor charging module of claim 1, wherein the power delivery device is a flyback transformer.

10. The capacitor charging module of claim 2, wherein the voltage divider comprises:
- a first resistor coupled to the first and second rectifier component; and
- a second resistor, coupled to the first resistor, the sample/hold circuit, and a ground level.

* * * * *